Jan. 15, 1963    G. ALFIERI    3,073,653
TRIPLEX COMPRESSED AIR DISTRIBUTOR, PARTICULARLY
FOR VEHICLE PNEUMATIC BRAKING SYSTEMS
Filed Oct. 10, 1960
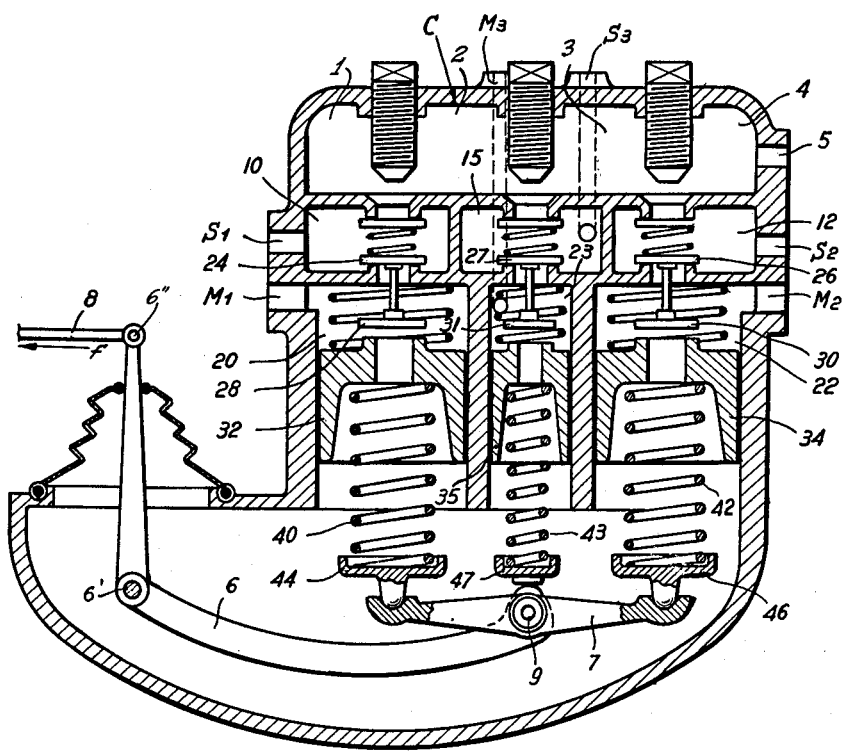
INVENTOR.
Giuseppe Alfieri
BY Singer, Stern & Carlberg

United States Patent Office 3,073,653
Patented Jan. 15, 1963

3,073,653
TRIPLEX COMPRESSED AIR DISTRIBUTOR, PARTICULARLY FOR VEHICLE PNEUMATIC BRAKING SYSTEMS
Giuseppe Alfieri, Milan, Italy, assignor to Fabbrica Italiana Magneti Marelli S.p.A., Milan, Italy, a corporation of Italy
Filed Oct. 10, 1960, Ser. No. 61,732
Claims priority, application Italy Nov. 10, 1959
2 Claims. (Cl. 303—53)

The present invention refers to a three sectioned or triplex compressed air distributor for vehicle pneumatic braking systems.

Normally the three distributing sections of such assemblies are connected to the three distinct braking sections of the vehicle, and in the specific case of a motor unit with a trailer, they feed the two sections of the motor unit (front and rear) and also that of the trailer or semitrailer.

The distributor is mounted on the motor unit, and goes into operation, regardless of the number of sections, whenever the vehicle driver applies a braking pressure on the brake pedal, and in fact this action operates the distributor control lever through a tie rod linkage.

In the case of the triplex distributor, the above mentioned lever operates the three sections not directly, but by means of two balancing elements mounted on the lever proper.

In particular, a first balancing element which is fulcrumed on the lever, and by means of an arm, controls one of the two lateral sections of the distributor and a second balancing element which is rotatably mounted on the other arm of the first balancing element, with its two respective sides, controls the other two sections.

The aim of the present invention is to simplify the control system of said distributors, and also to free the middle section from the equilibrating influence of the balancing elements so as to achieve a distribution of air in the central section independent of that in the outer sections. This latter situation is particularly advantageous when the central section is connected to the trailer, and the other two sections to the motor unit.

According to the present invention this can be achieved in triplex distributors by directly operating on the central section by means of the control lever, and on the lateral sections through an equilibrated balancing element.

The arms of the balancing unit which are fulcrumed at the control extremity of the lever as well as this latter act on the corresponding operating push rods of the sections (or distributors) by means of an adjusting spring.

The above described system also achieves an operating anticipation of the trailer in respect of the motor unit.

In fact, let it be assumed that the trailer is connected to the central section, with the choice of suitable values of exhaust closure run, and a regulating spring with suitable characteristics, the action of the central distributor can be suitably anticipated in relation to the lateral distributors, connected to the motor unit sections.

Further, the control system permits that the construction and the kinematic motion of control of normal duplex distributors, remain unaltered.

In fact with the adoption of a third central distributor with a reduced internal bore as employed in the case of feeding trailer servoautodistributors which require a very limited airflow, the apparatus (duplex) practically integrally retains all its characteristics of having constant run and operation load in the event of breakdown, to either of the sections.

The other features and particulars of the invention will be illustrated and described with reference to the attached drawing showing a schematic layout of a triplex distributor having a control system of the sections conforming to the present invention.

In the drawing C indicates the distributor body 1—2 and 3 indicates the three sections (or distributors) of the apparatus which are arranged parallel to each other and on the same plane.

Above the apparatus is located a chamber 4 which feeds all the sections, and is connected by pipe 5 to the cleaner control which in turn is fed by the plant compressor; the cleaner control and the compressor are not shown on the drawing.

Each section of the distributor is substantially comprised of two chambers: a first 10, 12, 15, connected directly to the corresponding section tank $S_1$, $S_2$, $S_3$ and to chamber 4 by means of a check valve, and a second chamber 20, 22, 23 connected directly to the moderating pipe $M_1$, $M_2$, $M_3$ of the corresponding braking section and to the adjacent first chamber 10, 12, 15 by means of an intercepting valve 24, 26, 27.

The stem of each valve 24, 26, 27, terminates in a small plate 28, 30 and 31, respectively, on which the extremity of push rods 32, 34 and 35 airtightly engage; push rods, 32, 34, 35, run airtightly in the lower wall of the chamber connected to the moderating pipe.

The other extremity of each push rod is subjected to the control action by means of an adjusting spring 40, 42, 43. Further, each push rod is furnished with a bore to allow discharge into the atmosphere of the air deriving from the moderating pipe during brake release operation phases.

Control of distributing sections 1, 2, 3 is obtained by means of lever 6 fulcrumed on point F and connected at extremity 6" to the transmission deriving from the brake pedal.

According to the invention, extremity 9 of the lever acts directly on section 2, and by means of balancing element 7 on the lateral sections 1 and 3. In such manner the central distributor 2 is under direct control and as a result is liberated from the equilibrating influence of the balancing element 7.

The two arms of the balancing element as well as the extremities 9 of the lever 6 act on the corresponding adjusting springs 40, 42, 43 through supporting caps 44, 46, 47.

The anticipation of section 2 is obtained with the employment of a push rod of suitable length and a spring 43 having suitable features.

The push rod is such as to contactually engage with the corresponding small plate before the lateral push rods reach their individual plates. In this manner if valve 27 of 2 opens earlier in respect of the other two, then the moderating pipe $M_3$ will be fed first before $M_1$ and $M_2$.

The apparatus operates as follows: In the drawing the distributor is shown in the idle phase. The compressed air travels through pipe 5, chamber 4, the check valves and reaches chambers 10, 12, 15 and from here the section tanks $S_1S_2S_3$.

The cut off valves 24, 26, 27 are closed and for which reason the moderating pipes are in communication with the atmosphere through their respective feed chambers 20, 22, 23, the bored operating push rods, and the exhaust ports located in body C below said chambers.

During braking phases, the driver when pushing on the brake pedal provokes the displacement of point 6" of the lever in the direction of the arrow $f$ and thus the displacement upwards of extremity 9 and balancing element 7. The push rods 32, 34, 35 therefore reach the corresponding small plates 28, 30, 31 and after closing of the exhaust and operating of the cut off valves 24, 26, 27, put chambers 10, 12, 15, in pre-established order in communication with the lower chambers 20, 22, 23 allowing the feeding of moderating pipes $M_1$ and $M_2$ directed to the braking sections of the motor unit and $M_3$ directed to the servoautodistributor of the trailer. On release of pressure from the foot pedal, the lever returns to the position shown in the drawing, and the various elements assume the idle phase position.

I claim:
1. A compressed air distributor of the three section type for composite vehicle braking systems, comprising a casing provided with three braking sections, a hollow push rod for each braking section, a first chamber in said casing and a second chamber in said casing, a check valve in said first casing chamber for each of said push rods and controlling the communication between said first chamber and the atmosphere, said check valves also controlling the communication between said first chamber and said second chamber, a source of compressed air connected to said casing in communication with said second chamber, said push rods of the side sections being arranged on opposite sides of said intermediate section, spring means engageable with each of said push rods, a rocker arm on said intermediate push rod having its ends engaging the push rods of the sections on each side of the intermediate section, and a manually operable first class lever pivotally connected to said casing with one end pivoted to the intermediate portion of said rocker lever whereby the central section and intermediate push rod of the distributor will be actuated directly by said manually operable lever so that the push rods of the side sections will then be equally controlled, and an actuating control rod connected to the other end of said first class lever adapted to be manually actuated.

2. A compressed air distributor for composite vehicle braking systems, comprising a casing having three independent braking sections, a push rod for each of said braking sections, valve means for each braking section engageable by a corresponding push rod, first and second chambers in said casing, a source of pressure fluid for one of said chambers, the other chamber being connected to at least three braking units of said vehicle braking system, a rocker arm extending across said three braking sections and operably connected to an intermediate push rod, the end portions of said rocker arm being operably connected to the endmost push rods, and a first class lever pivoted to said casing with one end connected to the intermediate portion of said rocker arm, and a manually operable control rod connected to the other end of said first class lever whereby actuation of said manually operable control rod will initially actuate the intermediate push rod directly while the end portions of said lever arm will then follow and engage the endmost push rods and permit an equal force to be exerted thereon.

References Cited in the file of this patent

UNITED STATES PATENTS

| | | |
|---|---|---|
| 2,680,654 | Edge et al. | June 8, 1954 |
| 2,964,360 | Alfieri | Dec. 13, 1960 |

FOREIGN PATENTS

| | | |
|---|---|---|
| 463,662 | Canada | Mar. 14, 1950 |
| 1,073,760 | France | Mar. 24, 1954 |
| 813,001 | Great Britain | May 6, 1959 |